(12) United States Patent
Madaan et al.

(10) Patent No.: US 8,239,387 B2
(45) Date of Patent: Aug. 7, 2012

(54) STRUCTURAL CLUSTERING AND TEMPLATE IDENTIFICATION FOR ELECTRONIC DOCUMENTS

(75) Inventors: Amit Madaan, Uttar Pradesh (IN); V. G. Vinod Vydiswaran, Maharashtra (IN); Rupesh R. Mehta, Maharashtra (IN)

(73) Assignee: Yahoo! Inc., Sunnyvale, CA (US)

( * ) Notice: Subject to any disclaimer, the term of this patent is extended or adjusted under 35 U.S.C. 154(b) by 1105 days.

(21) Appl. No.: 12/035,948

(22) Filed: Feb. 22, 2008

(65) Prior Publication Data

US 2009/0216708 A1 Aug. 27, 2009

(51) Int. Cl.
*G06F 17/30* (2006.01)
(52) U.S. Cl. ........ 707/737; 707/713; 707/729; 707/779; 707/802
(58) Field of Classification Search .................. 707/713, 707/714, 720, 737, 779, 729, 802
See application file for complete search history.

(56) References Cited

U.S. PATENT DOCUMENTS

| | | | |
|---|---|---|---|
| 2005/0280719 A1* | 12/2005 | Kim et al. .................. 348/231.2 |
| 2006/0265364 A1* | 11/2006 | Keith, Jr. ............................ 707/3 |
| 2006/0271533 A1* | 11/2006 | Sakurai et al. ..................... 707/5 |
| 2007/0078758 A1* | 4/2007 | Susskind et al. ................. 705/38 |
| 2007/0112754 A1* | 5/2007 | Haigh et al. ....................... 707/5 |
| 2007/0130176 A1* | 6/2007 | Kawabe et al. ............... 707/100 |
| 2007/0136255 A1* | 6/2007 | Rizzo et al. ........................ 707/3 |
| 2008/0010292 A1* | 1/2008 | Poola ............................. 707/10 |
| 2008/0027924 A1* | 1/2008 | Hamilton et al. .................. 707/5 |
| 2008/0044016 A1* | 2/2008 | Henzinger ..................... 380/201 |
| 2008/0046441 A1* | 2/2008 | Wen et al. ..................... 707/100 |

OTHER PUBLICATIONS

Zheng et al., "Joint Optimization of Wrapper Generation and Template Detection" Conference on Knowledge Discovery in Data Proceedings of the 13$^{th}$ ACM SIGKDD International Conference on Knowledge Discovery and Data Mining, pp. 894-902, 2007.

* cited by examiner

*Primary Examiner* — Jean M Corrielus
*Assistant Examiner* — Andalib Lodhi
(74) *Attorney, Agent, or Firm* — Berkeley Law & Technology, LLP (57) ABSTRACT

Subject matter disclosed herein may relate to clustering electronic documents, such as, for example, web pages, and may also relate to template identification for electronic documents.

27 Claims, 7 Drawing Sheets

Cluster Hierarchy 410

STRUCTURAL CLUSTERING AND TEMPLATE IDENTIFICATION FOR ELECTRONIC DOCUMENTS

FIELD

Subject matter disclosed herein may relate to clustering and template identification for electronic documents.

BACKGROUND

The Internet is a worldwide system of computer networks and is a public, self-sustaining facility that is accessible to tens of millions of people worldwide. The most widely used part of the Internet is the World Wide Web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

Through the use of the web, individuals have access to millions of pages of information. However a significant drawback with using the web is that because there is so little organization, at times it can be extremely difficult for users to locate the particular pages that contain the information that is of interest to them. To address this problem, "search engines" have been developed to index a large number of web pages and to provide an interface that can be used to search the indexed information by entering certain words or phases to be queried.

Search engines may generally be constructed using several common functions. Typically, each search engine has one or more "web crawlers" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Also, each search engine may include information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Further, each search engine provides a search tool that allows users, through a user interface, to search the databases in order to locate specific documents, and their location on the web (e.g., a URL), that contain information that is of interest to them.

With the advent of e-commerce, many web pages are dynamic in their content. Typical examples are products sold at discounted prices that change periodically, or hotel rooms that may change their room fares on a seasonal basis. Therefore, it may be desirable to update crawled content on frequent and near real-time bases.

Information Extraction (IE) systems may be used to gather and manipulate the unstructured and semi-structured information on the web and populate backend databases with structured records. In a website with a reasonable number of pages, information (e.g., products, jobs, etc.) is typically stored in a backend database and is accessed by a set of scripts for presentation of the information to the user. IE systems commonly use extraction templates to facilitate the extraction of desired information from a group of web pages. Generally, an extraction template is based on the general layout of the group of pages for which the corresponding extraction template is defined. Such systems may face difficulties due to the complexity and variability of the large numbers of web pages from which information is to be gathered. Such systems may require a great deal of cost, both in terms of computing resources and time. Also, relatively large expenses may be incurred in some situations by the need for human intervention during the information extraction process.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript objects. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, information extraction systems and/or processes may incur costs in terms of computing resources, time, and/or costs associated with human intervention in the extraction process. Therefore, techniques for reducing these and/or other costs may be desirable. For an embodiment, a data extraction process may comprise utilization of what may be termed a "lightweight" clustering process and may also comprise utilization of expression-based document similarity models to generate and/or identify templates used for data extraction. For an embodiment, the number of clusters may be reduced by merging structurally similar clusters generated by the lightweight clustering process. Heterogeneous clusters may also be identified, and feedback may be provided to the clustering process for further processing of such clusters. Also for an embodiment, unique templates may be identified if present in a given website. Of course, these are merely examples of possible embodiments for clustering documents and generating templates, and the scope of claimed subject matter is not limited in these respects.

For a further embodiment, a lightweight clustering process may be used to cluster a plurality of web pages. A cost function may be utilized to calculate the cost of generating a template for each of the clusters. If a web page does not completely match a template, the template may be modified to accommodate the changes introduced by the web page. The modification may incur a cost. For an embodiment, if the cost does not exceed a specified threshold, the web page may be considered to be similar to the pages on which the template was built. If the cost does exceed the specified threshold, the page may be rejected, or "dropped". For this embodiment, the specified cost threshold may define the amount of acceptable change any web page can induce on the template.

As used herein, the term "document" is meant to include any organization of digital information represented in any markup language which is capable of being stored or transmitted within a computing system and/or network. One example document may comprise a web page, although the scope of claimed subject matter is not limited in this respect.

Also, as used herein, the term "lightweight clustering" is meant to include any of a wide range of techniques for clustering electronic documents that incur relatively small computational costs, including the URL based processes described herein. By performing the lightweight clustering prior to performing regular expression based clustering, performance improvements may be realized due to the more efficient processing of the clustered pages. Also, by using lightweight clustering techniques, the process is highly scalable, as the process for clustering the pages does not become overly burdensome due to the relatively small computational costs of the clustering process.

Figure 1:
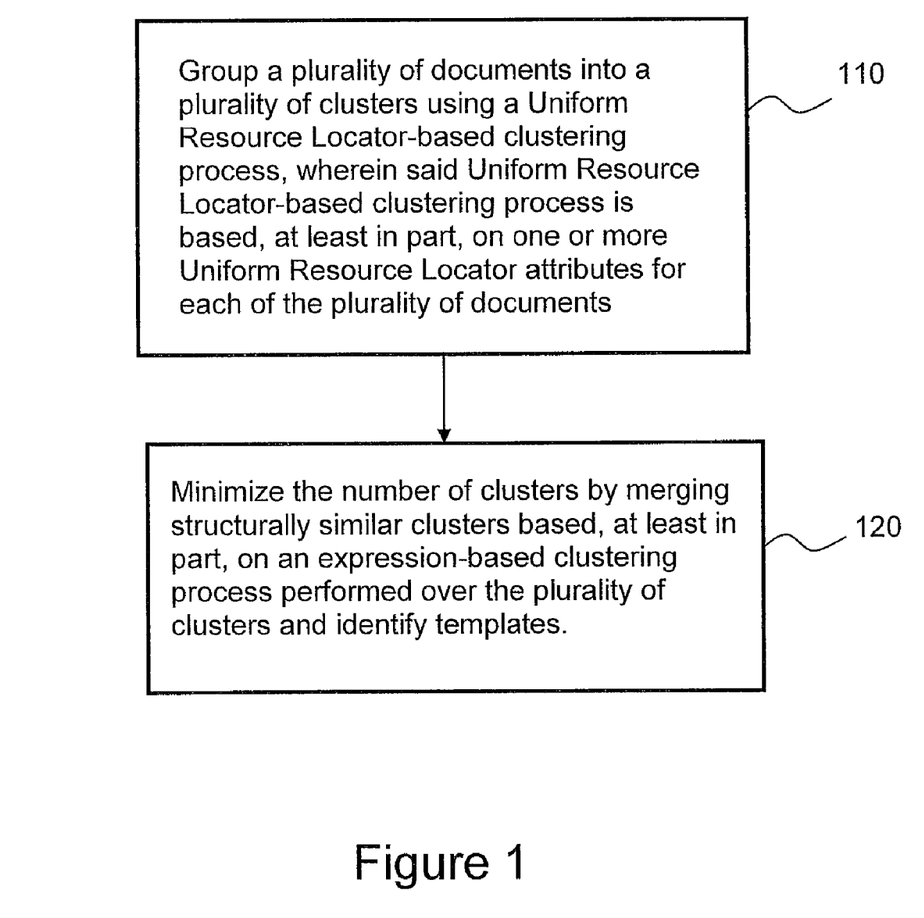
FIG. 1 is a flow diagram of an example process for structural clustering and template identification in accordance with an embodiment.

FIG. 1 is a flow diagram of an example process for structural clustering and template generation in accordance with an embodiment. At block 110, a plurality of documents may be grouped into a plurality of clusters. The grouping, or clustering, may be based, at least in part, on one or more Uniform Resource Locator (URL) attributes for each of the plurality of documents. This process may be referred to as a Uniform Resource Locater-based clustering process, and may be considered to be a lightweight clustering process. Further examples of clustering in accordance with claimed subject matter are described below. At block 120, the number of clusters generated by the URL-based clustering process may be minimized by merging structurally similar clusters based, at least in part, on an expression-based clustering process performed over the plurality of clusters formed by the URL-based clustering process. The expression-based clustering process may include generating an initial template based, at least in part, on a structure of at least a portion of a first document from a first subset of a first cluster. The first subset may include a plurality of documents that are sampled from the first cluster. That is, the initial template may be formed by observing the structure of at least a portion of one of the documents from a sampled subset of the cluster in question. Also, in an embodiment, the initial template may be generalized to form a generalized template. The generalized template may be based, at least in part, on comparisons between the structure of the initial template and the structures of at least portions of one or more other documents from the sampled subset of documents. Further examples of generating templates in accordance with claimed subject matter are described below. Also, example processes in accordance with claimed subject matter may include all, more than all, or less than all of blocks 110-120, and the scope of claimed subject matter is not limited in this respect.

Figure 2:
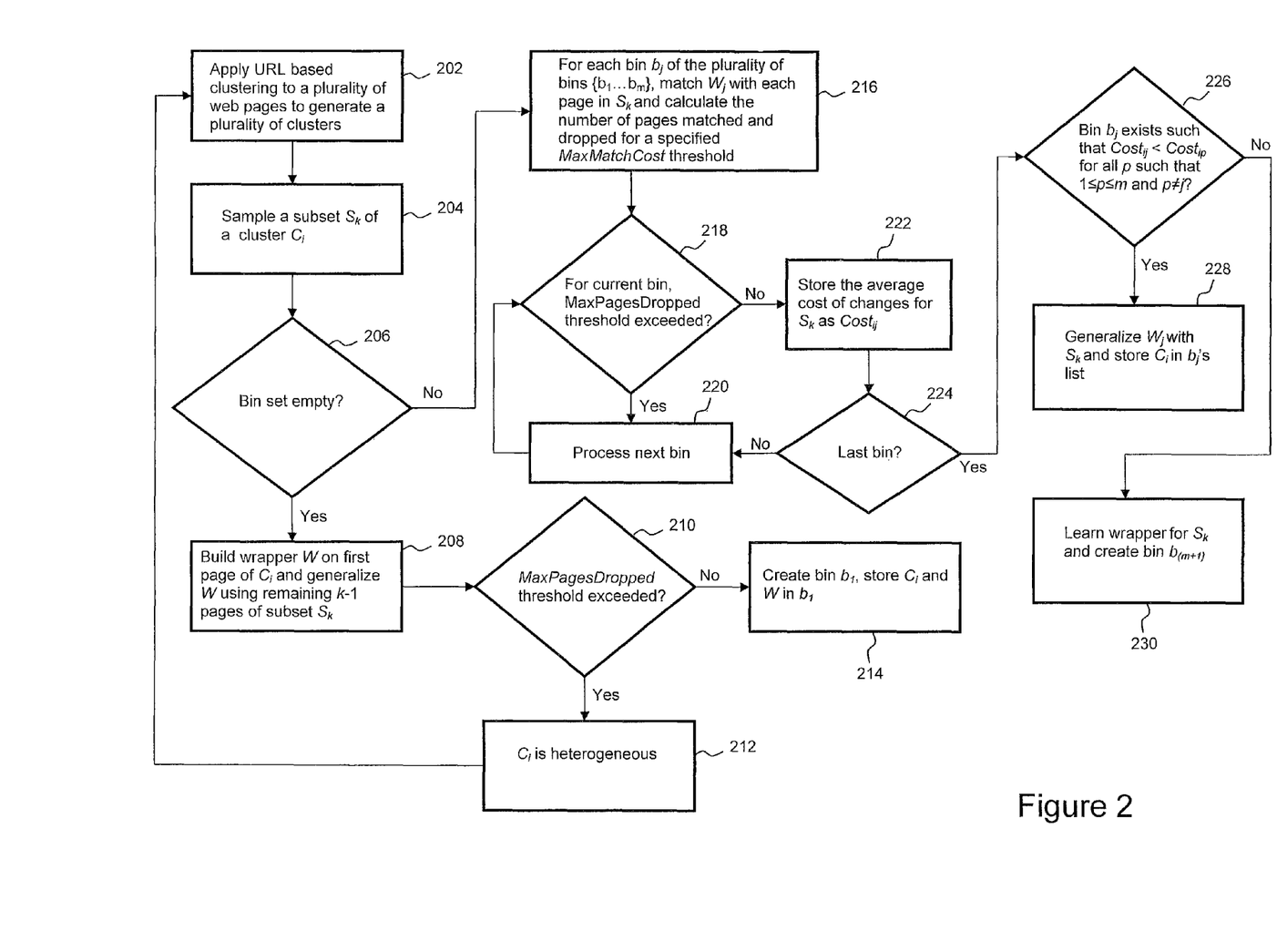
FIG. 2 is a flow diagram of an additional example process for structural clustering and template identification in accordance with an embodiment.

FIG. 2 is a flow diagram of an additional example process for structural clustering and template identification in accordance with an embodiment. At block 202, lightweight URL-based clustering may be applied to a plurality of web pages to generate a plurality of clusters. At block 204, a subset $S_k$ may be sampled from a cluster $C_i$ from the plurality of clusters. As indicated at block 206, if a bin set is empty, a wrapper W may be built on a first page of $C_i$ and the wrapper (which may also be referred to as a template) W may be generalized using the remaining k−1 pages of subset $S_k$. As used herein, the term "bin" is meant to denote any logical organization of stored data. An "empty bin set" means that no bins have been organized, and the term "empty bin" means that one or more bins have been organized, but that the bin does not contain any data. Also, as used herein, the term "wrapper" is meant to denote a template based on one or more pages of a cluster. The terms "template" and "wrapper" may be used interchangeably herein. For this embodiment, wrapper W may be built, that is, formed or generated, based on at least a portion of the structure of one or more pages of cluster $C_i$, as indicated at block 208. Wrapper W may incorporate one or more structural attributes of one or more pages of cluster $C_i$. Also at block 208, wrapper W may be generalized using the remaining k−1 pages of subset S. The generalization of W may include comparing the structure of the wrapper with the structures of at least a portion of the documents making up the remaining subset (all of the pages of the subset with the exception of the first page which was used to initially generate the wrapper).

During the generalization of wrapper W, a determination may be made as to whether a MaxPagesDropped threshold has been exceeded, as depicted at block 210. A page may be said to be dropped if the wrapper can not be generalized for that particular page without incurring too large a cost. The amount of acceptable cost may be expressed as a MaxMatchCost threshold value. In general, for one example, the more a page would induce significant changes to the structure of a wrapper, the higher the cost. If the MaxPagesDropped threshold is exceed in generalizing wrapper W, cluster $C_i$ may be determined to be heterogeneous (too many pages varying too widely from the structure of the wrapper), and at block 212 processing may cease for cluster $C_i$. If the MaxPagesDropped threshold has not been exceeded, at block 214 a bin $b_1$ may be created, and wrapper W and cluster $C_i$ may be stored in bin $b_1$.

For an embodiment, information regarding heterogeneous clusters obtained at block 212 may be provided back to block 202 to allow refinement of the URL-based clustering process to permit further clustering of previously heterogeneous clusters. Various parameters of the URL-based clustering process may be modified in accordance with the information provided by block 212 to block 202.

If at block 206 a determination is made that the bin set is not empty, the process proceeds to block 216. At block 216, for each bin $b_j$ of a plurality of bins $\{b_1 \ldots b_m\}$, match wrapper $W_j$ with each page in the subset $S_k$. Also, the number of pages matched and the number of pages dropped for a specified MaxMatchCost threshold may be calculated. As indicated at block 218, if for a current bin the MaxPagesDropped threshold has been exceeded, processing moves on to a next bin at block 220, and the process returns to block 218 where the next bin becomes the current bin. If at block 218 a determination is made that for the current bin the MaxPagesDropped threshold has not been exceeded, the average cost of changes induced by the subset of pages $S_k$ may be stored, and may be represented by the value $Cost_{ij}$. As indicated at block 224, if the current bin is not the last bin, the process moves to block 220 where a next bin is processed according to the procedure described above. If the current bin is the last bin, the process proceeds to block 226.

At block 226, a search may be made to find a bin such that the cost of generalizing the wrapper for that bin based on the sample $S_k$ from the current cluster ($Cost_{ij}$) is less than the cost of generalizing the wrappers for all other bins ($Cost_{ip}$, where $1 \leq p \leq m$ and $p \neq j$). This process may be referred to as a "matching" process. If at block 226 a match is found, the wrapper $W_j$ for the matching bin may be generalized based on the documents from sampled subset $S_k$. Current cluster $C_i$ and/or information related to cluster $C_i$ may also be stored in bin $b_j$. If at block 226 a match is not found, a new wrapper may be learned based on the documents of subset $S_k$. Also, a new bin $b_{(m+1)}$ may be created and added to the bin set.

The process described above in connection with blocks 202 through 230 may be repeated for each cluster generated by the lightweight clustering process of block 202. The end result may be a number of bins each including a template that is unique to that particular bin and one or more clusters that may have been merged into the bin based on the similarity functions performed as part of the expression-based clustering represented in this example by blocks 216 through 230. In this manner, the number of bins resulting from the expression-based clustering process is less than the original number of clusters produced by the URL-based clustering process. The original clusters, therefore, may be merged into a smaller number of clusters The plurality of bins for this example embodiment may represent a reduced cluster set, as previously described. The number of clusters produced by the URL clustering may be reduced by the expression-based clustering. Each bin may contain one or more clusters originally generated by the URL clustering, and each bin may also include a template that uniquely identifies the clusters in the bin. In this manner, the universe of bins may completely describe a given web site, for an example.

By performing the URL-based clustering prior to performing the expression-based clustering, the added expense of the expression-based clustering process may be reduced due to the initial clustering performed by the URL-based clustering process. Thus, the example embodiments described herein may provide a highly scalable, efficient clustering process that may be advantageously utilized in information extraction processes performed on electronic documents, such as, for example, web pages. However, these are merely examples of how the embodiments disclosed herein may be utilized, and the scope of claimed subject matter is not limited in this respect.

Of course, the process described above in connection with FIG. 2 is merely an example process, and other embodiments are possible. Also, example processes in accordance with claimed subject matter may include all, more than all, or less than all of blocks 202-230. Further, the order of blocks 202-230 is merely an example order, and the scope of claimed subject matter is not limited in this respect.

Figure 3:
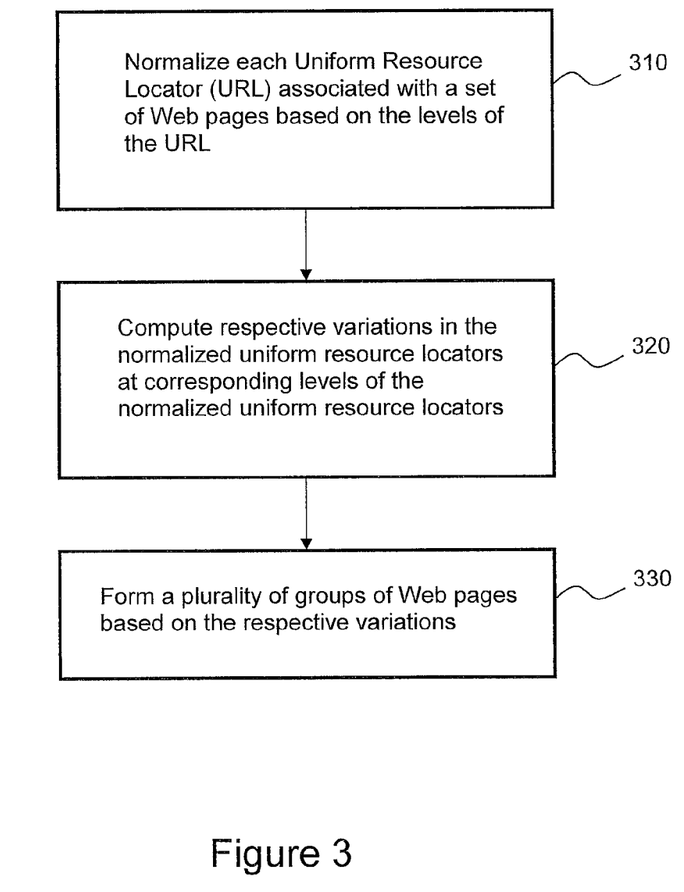
FIG. 3 is a flow diagram of an example process for clustering a plurality of web pages in accordance with an embodiment.

FIG. 3 is a flow diagram of an example process for clustering a plurality of web pages in accordance with an embodiment. FIG. 3 illustrates an example automated process for grouping structurally similar web pages based on the URLs of the web pages, according to one or more embodiments. This example flow diagram may represent part of a lightweight clustering process that may be used in conjunction with an expression-based clustering process, as described above, for example, in connection with FIG. 2. In one or more embodiments, the process illustrated in FIG. 3 may be implemented for automated performance by a conventional computing system, such as, for example, computer system 600 of FIG. 6. Further, in one or more embodiments, the process illustrated in FIG. 3 may be implemented for automated performance within software system architecture, and/or by a combination of hardware and software.

At block 310 of FIG. 3, each Uniform Resource Locator (URL) associated with a set of web pages may be normalized based on the levels of the URL. As a result of the level-based normalization, the portion of the URLs at corresponding levels may be readily compared to determine whether the portions for respective URLs are the same or different. At block 320, the variation in the normalized URLs at corresponding levels of the URLs may be computed. At block 330, a plurality of groups of web pages may be formed based on the respective variations at levels of the URLs in each respective group. Example processes in accordance with claimed subject matter may include all, more than all, or less than all of blocks 310-330. Further, the order of blocks 310-330 is merely an example order, and the scope of claimed subject matter is not limited in this respect.

Figure 4:
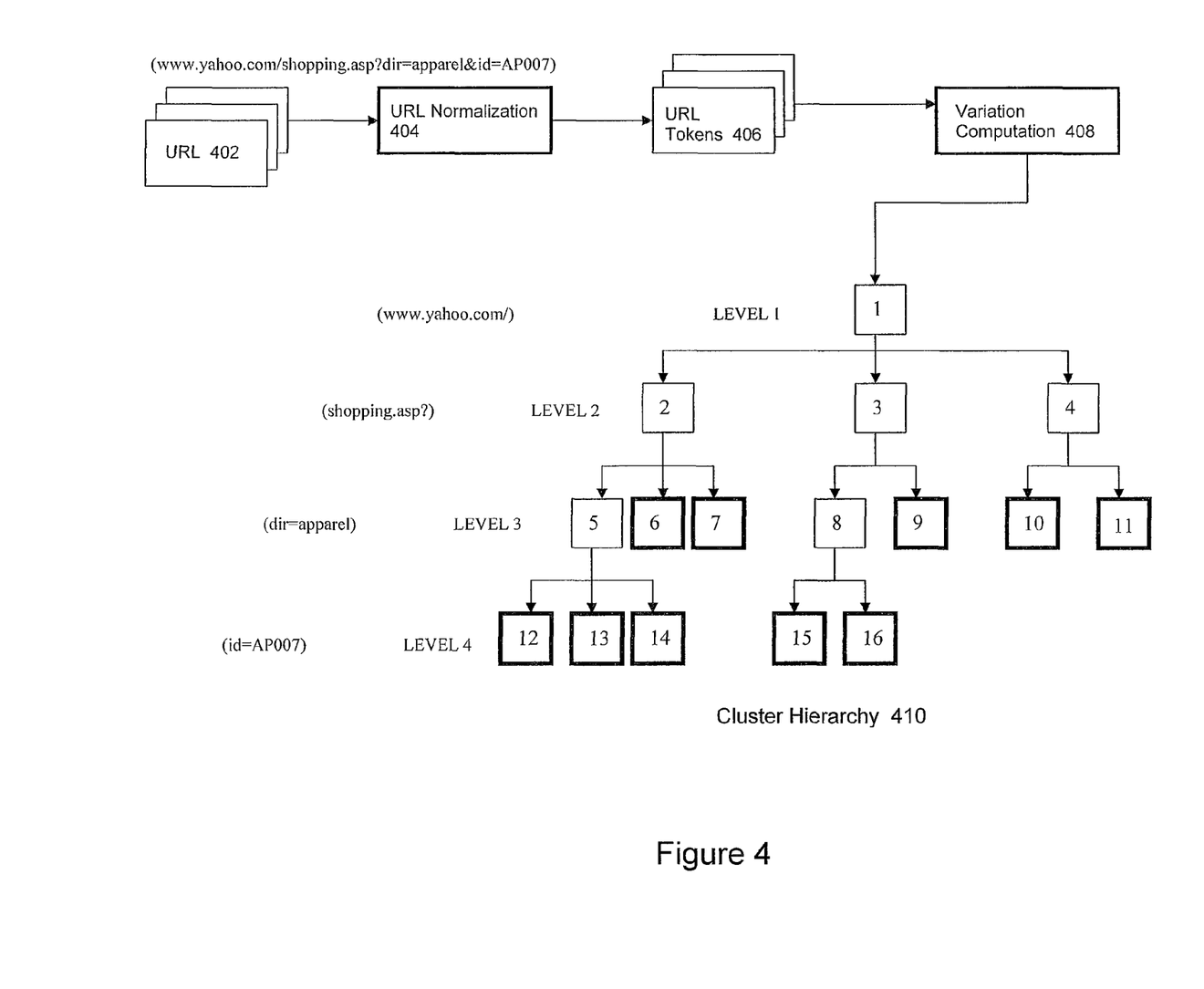
FIG. 4 is a block diagram depicting an example cluster hierarchy in accordance with an embodiment.

FIG. 4 is a block diagram depicting an example cluster hierarchy in accordance with an embodiment, and FIG. 4 illustrates the operational functionality of an example URL based clustering technique. According to one embodiment, URL based clustering, which may be referred to herein as "CURL" (Clustering URLs), may involve URL normalization and URL variation computation. A non-limiting example use of CURL is in the context of a 'vertical' website, which may generally comprise a website that provides a gateway or portal to information related to a particular concept or industry, such as, for example, shopping, travel, jobs, health care, insurance, automobiles, etc. CURL is based on the premise that similar URLs may have similar structures, i.e., similar URLs point to similar types of pages within a given vertical web site (e.g., product pages, or listings/browse pages, or non-product pages, etc., for a shopping vertical) and/or point to similar types of information within pages (e.g., product information in a product page). If a script is used to generate web pages, all pages generated by the script typically have a similar structure or layout, with conditionals in the script changing the actual content within portions of such pages. Therefore, the CURL techniques described herein may attempt to group pages generated by the same script and therefore which are structurally similar, based at least in part on the URLs associated with such pages.

FIG. 4 illustrates that each URL 402 from a group of URLs associated with a domain, such as a particular website domain, may be used as input to an example URL normalization process 404. A set of URL tokens 406 may be output from URL normalization 404 and used as input to a variation computation process 208, from which a multi-level cluster hierarchy 410 may be output. Cluster hierarchy 410 is depicted having four levels (Level 1-Level 4) for purposes of example only and, of course, the scope of claimed subject matter is not limited in this respect.

Each URL 402 input into URL normalization 404 for this example may be retrieved from a crawler storage, such as, for example, the crawler storage described below in connection with FIG. 7. URL normalization 404 may tokenize URLs 402 into multiple tokens based on pattern changes. URL normalization 404 may be based on "level" information derived from the URLs. URL normalization 404 and variation computation 408 may be considered scalable processes because these processes do not require parsing web pages in order to cluster structurally similar pages within a domain.

It may be desirable to build the cluster hierarchy 410 by clustering pages at levels that demonstrate the least, or less, variation relative to other levels. As depicted in FIG. 4, variation computation 408 may generate a multi-level cluster hierarchy 410. In cluster hierarchy 410, each of blocks 1-16 may represent a cluster of pages determined by the CURL process, where leaf node clusters are depicted as bold blocks. According to one or more embodiments, levels of a URL may be determined using one or more static token delimiters (e.g., standard, unlearned URL delimiters), (b) learned token delimiters (delimiters learned from the set of URLs under consideration), and/or (c) unit change denominations. Some levels may be separated by static delimiters, such as, for example, symbols: '/', '?', or '&'. Sublevels of each level are also considered, where sublevels may be determined by learned token delimiters. That is, sublevels at any particular level may be separated by learned token delimiters which may be "special characters," such as, by way of non-limiting examples, '=' (e.g., key-value pairs), '_', '-', '~', '#', '$', etc. The term "special characters" as used herein refers to the visible characters which are neither alphabets nor numeric, not including the delimiters which are chosen for static delimiters. For example, with a group of web pages having URLs with "product_review" or "product_information", the "_" may be considered to delimit two different structures for content and, therefore, two different levels for clustering the group of pages. The term 'learned token delimiters' as used herein may indicate that the set of possible learned token delimiters is not restricted or limited.

For an embodiment, unit change denominations may represent a change from one unit to another, where units may comprise letters, numbers, and/or symbols other than the foregoing symbols used as static and learned token delimiters, and where multiple URLs may be characterized with the same pattern. For example, "123ABC" contains a unit change from a series of numbers to a series of letters.

Consider the following example URL: www.yahoo.com/shopping.asp?dir=apparel&id=AP007. For this example, the levels comprise (1) "www.yahoo.com", (2) "shopping.asp", (3) "dir=apparel", and (4) "id=AP007". Sublevels for the level "dir=apparel" comprise (i) "dir", and (ii) "apparel" based on a learned token delimiter key-value pair. Sublevels for the level "id=AP007" comprise (i)"id", (ii) "AP", and (iii) "007" based on a learned token delimiter key-value pair (id=AP007) and a unit change (from letters "AP" to numbers "007").

Once appropriate delimiters are determined for a group of URLs, and the one or more levels of each URL 402 in the group are determined, URL normalization 404 may normalize the URLs by tokenizing the URLs. Tokenizing the URLs may involve assigning a unique token value to each level of the URLs, resulting in a set of tokens that represents each corresponding URL. Each token value in a set may uniquely identify the portion of the URL at the corresponding level of the URL. With the foregoing example URL "www.yahoo.com/shopping.asp?dir=apparel&id=AP007", a unique token is used to characterize each of the levels "www.yahoo.com", "shopping.asp", "dir=apparel", and "id=AP007". FIG. 4 shows how the different levels of this example URL may map to levels 1-4 of the cluster hierarchy 410, where the example URL would be a member of one of the clusters 1-16 at each corresponding level. Similarly, each of the sublevels "dir", "apparel", "id", "AP", and "007" may be characterized by a token. Note that each demarcation of a cluster is based on tokens at a particular level. However, note that for this example it is the URLs that are members of clusters.

According to one or more embodiments, normalized information may be used to label the clusters based on identifiers, keywords, etc., generated by URL normalization 404. In response to normalizing the URLs (e.g., URL normalization 404), variation computation 408 may cluster pages at some levels of the cluster hierarchy 410 based on the respective variation at the levels. That is, variation computation 408 may consider clustering the level of the cluster hierarchy 410 that has the minimum "variation", defined as follows. According to one or more embodiments, variation at level L is based on keywords within the URLs at level L, and may be defined as:

Variation $(L)$=(Number of distinct URL keywords at $L$)/(Total number of URLs under consideration).

For an embodiment, variation at level L may based on 'Entropy', which may be defined as:

$$\text{Entropy}\,(L) = -\sum_{i=1}^{n} p(i)\log_{n} p(i),$$

where $p(i)$ is the probability of the $i^{th}$ URL keyword being at level L.

Also for an embodiment, as the count of distinct keywords at a given level may be used to represent the variation at that level, variation computation 408 of CURL may provide clustering preference to the level with the minimum variation. Minimum variation may equate to maximum URL affinity at that level, relative to the other levels of the group of URLs. Hence, as a result of fewer distinct terms at that level, it is highly probable that each distinct term and the corresponding pages pointed to by the URLs at that level are generated by the same script or generation template and, therefore, may be structurally similar.

Clustering URLs, and therefore clustering corresponding pages, at a particular level may result in a number of child clusters at the next lower level equal to the number of distinct keywords at that next lower level, with each child cluster at that next lower level containing the URLs with the corresponding distinct cluster-keyword. For example, consider the following three URLs: "www.yahoo.com/shopping/dir=apparel", "www.yahoo.com/shopping/dir=furniture", and "www.yahoo.com/travel/dest=mars". The variation at level L1 for this example is 0.33 (⅓) as "www.yahoo.com" is common across all URLs, and the variation at level L2 for this example is 0.66 (⅔) as "shopping" and "travel" are the only set of keywords at L2. The variation at level L3 for this example is the variation of the keys of the key-value pairs at that level, which is 0.66 (⅔) because "dir" and "dest" are the only two distinct keywords at L3. Because level L1 has the smallest variation, level L1 is selected for forming the first cluster, with a label such as "www.yahoo.com". Thus, all three URLs are grouped together in a single level L1 cluster. Also, "www.yahoo.com/shopping/dir=apparel" and "www.yahoo.com/shopping/dir=furniture" may be grouped together in a level L2 cluster and "www.yahoo.com/travel/dest=mars" may be placed in a different level L2 cluster. Finally, "www.yahoo.com/shopping/dir=apparel" may placed in a level L3 cluster, and "www.yahoo.com/shopping/dir=furniture" may be placed in a different level L3 cluster. Clusters at each level can be either (a) an internal cluster node, in which case the cluster points to all the child clusters and, optionally, stores all the URLs in that cluster (i.e., a union of all URLs in the child clusters); or (b) a leaf cluster, in which case the cluster does not have any child clusters to point to and therefore stores just the URLs in that cluster.

As previously mentioned, clustering in this manner may produce the same number of child clusters at a given level as the number of distinct keywords in the set of URLs at that level. This process may be continued until a state is reached in which there are no levels remaining for further clustering or there are no levels whose variation is greater than a "variation threshold", where the variation threshold is the minimum variation value required for any set of URLs at a level to be considered for clustering. The variation threshold may also denote the minimum number of URLs that should be present in each of the child clusters resulted by clustering a particular level. According to one embodiment, the variation threshold may be a function of the number of URLs under consideration, such as the number of URLs associated with a particular domain. According to an alternative embodiment, level-based variation thresholds may be dynamically determined for each cluster as a function of the number of URLs associated with a particular domain, the particular level of the cluster, and the number of URLs in the cluster.

For one embodiment, clusters may be identified that may possibly be discarded based on the number of URLs in the cluster. The cluster under consideration should pass the corresponding variation threshold for one or more child clusters to be discarded based on a "cluster threshold", which may comprise the minimum number of URLs of which a child cluster should be comprised. Stated otherwise, if the cluster threshold is not met for a cluster at a given level, then the cluster may be considered an "unimportant" cluster and the extraction of indexable keywords for the pages corresponding to this cluster may be avoided.

As depicted in FIG. 4, execution of an example CURL process may result in a cluster hierarchy 410. For one embodiment, in cluster hierarchy 410 every leaf node (depicted in bold) may represent a collection of structurally similar URLs and non-leaf nodes may contain references or pointers to corresponding child nodes/clusters along with pointers to the URLs corresponding to the child nodes/clusters.

The example URL clustering process described herein may provide a scalable information extraction enhancement tool for extracting information from web pages associated with a website or other domain. For example, uses of the techniques described herein may be used for extracting information from domain-specific web pages, such as for feeding vertical sites (e.g., verticals regarding products, travel, jobs, etc.), and for focused web crawling by providing feedback to the crawler in order to narrow the crawl domain to a subset of pages. Furthermore, the example processes may help eliminate 'noise' from websites and web pages in the context of extracting information from the websites, by providing focus to the extraction process.

In response to structurally similar web pages being identified using the techniques described herein, such pages (e.g., pages grouped in a leaf node cluster) may be fed to a wrapper induction process for extraction template generation. The wrapper induction process may look at sample pages from a cluster to generate an extraction template for pages in the cluster, and the extraction template may be used to extract interesting information from the pages of the cluster.

Figure 5:
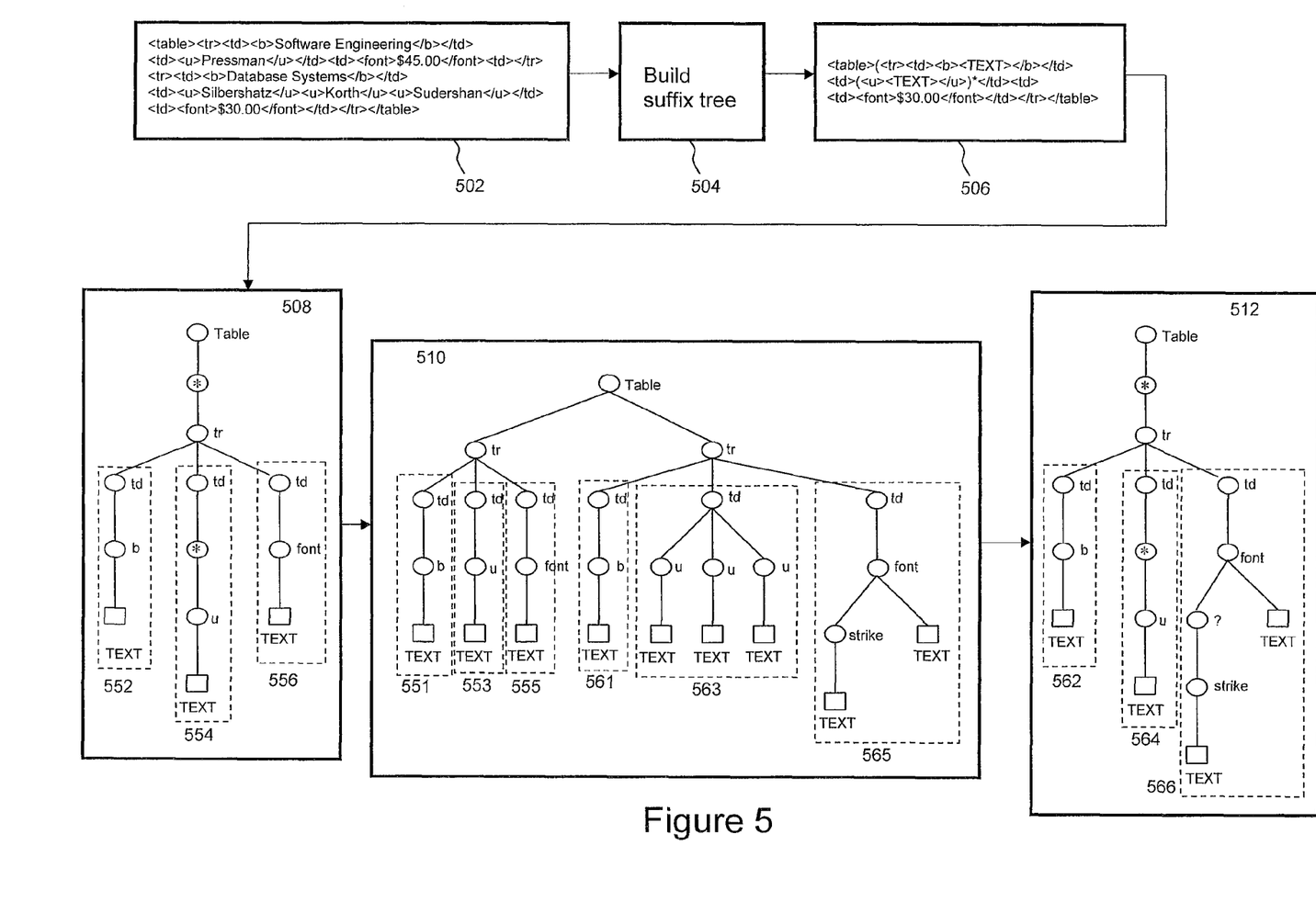
FIG. 5 is a diagram depicting the formation of an example generalized template in accordance with an embodiment.

FIG. 5 is a diagram depicting the formation of an example generalized template in accordance with an embodiment. This example may be implemented as part of an expression-based clustering process that may be used in conjunction with a lightweight URL-based process, as described above, for example, in connection with FIG. 2. In general, an initial template may be created. The initial template may be generalized by comparing the template to a set of training documents, which, for one or more embodiments disclosed herein, may comprise a subset of the pages of a cluster. In one embodiment, the template may be compared to a document object model (DOM) for at least a portion of each of the training documents. Thus, as used herein, the phrase "comparing the template to a DOM", and other similar phrases, may refer to comparing the structure of the template to the structure of a DOM that models at least a portion of a document. The initial template may be created based on example HTML 502, for this example. For this example, example HTML 502 may represent a relevant portion of a shopping web page. Also for this example, a goal may be to build a template suitable for extracting information from shopping web sites.

For this example embodiment, a suffix tree 504 may be created from example HTML 502. Suffix tree 504 may comprise a data-structure that represents suffixes starting from all positions in the sequence, S. Suffix-tree 504 may be used to identify continuous-repeating patterns. However, a structure other than suffix tree 504 may be used to identify patterns, and the scope of claimed subject matter is not limited in this respect. Suffix tree 504 may be analyzed to generate a regular expression ("Regex") HTML 506.

An initial template 508 may be generated from the regex 506. For an embodiment, a template may include HTML nodes and nodes corresponding to defined operators. Examples of an HTML node may comprise HTML tags (e.g., title, table, tr, td, h1, h2, p, etc.). Examples of defined operators include, but are not limited to, STAR, HOOK, and/or OR. A STAR operator may indicate that any subtrees that stem from children of the STAR operator are allowed to occur one or more times in the DOM. A HOOK operator may indicate that the underlying subtrees are optional. In one embodiment, a HOOK operator may be allowed to have only one underlying subtree. In other words, a HOOK operator is allowed to have only a single child, in one embodiment. An OR operator in the template may indicate that only one of the sub-trees underlying the OR operator is allowed to occur at the corresponding position in the DOM. It is not required that the template contain HTML nodes. In one example embodiment, the template may include XML nodes and nodes corresponding to defined operators.

Box 510 depicts an example DOM structure for a document in the training set, which, for this example, may comprise a page of a subset of a cluster, as described above in connection with FIG. 2. Box 512 for this example depicts a generalized version of the initial template 508, which is automatically generated in accordance with an embodiment. As previously mentioned, the template is generalized such that its structure matches that of a common structure of the training documents. For this embodiment, the training set comprises a subset of documents sampled from a cluster of web pages. To generalize the template 508 to match the particular DOM structure 510, first the template 508 is compared to the DOM 510 to determine the differences. Differences may be resolved by adding one or more operators to the template 508, which may result in matching the template 508 to the current DOM 510 by making the template 508 more general. The example of FIG. 5 is an example of a HOOK operator that has been added to a template, in accordance with an embodiment. For this example, the STAR operator may be represented by '*', and the HOOK operator may be represented by '?'.

In general, given a new document for learning, the DOM of the document may be matched with the template in a depth first fashion, in an embodiment. By depth first, it is meant that processing may proceed from a parent node to the leftmost child node of the parent. After processing all of the leftmost child's subtrees in a depth-most fashion, the child to the right of the leftmost child is processed. If there is a mismatch between tags, a mismatch routine may be invoked in order to determine whether to match the template to the DOM.

Comparing the template to the DOM may depend on the type of operator that is the parent of a sub-tree in the template, in an embodiment. For example, if a STAR operator is encountered in the template, the subtree of the STAR operator may be compared to the corresponding portion of the DOM in accordance with STAR operator processing. Subtrees having a HOOK operator or an OR operator as a parent node may be processed in accordance with HOOK operator processing and OR operator processing respectively, in accordance with an embodiment.

Processing of a sub-tree under a STAR node in the template may occur by traversing the nodes in the sub-tree in a depth-most fashion, comparing the template nodes with the DOM nodes. If all children match at least once, the STAR sub-tree may be said to match the corresponding sub-tree in the DOM. As an example, referring to FIG. 5, the leftmost "tr" node in DOM 510 matches the STAR sub-tree in template 508 as follows. Sub-tree 551 matches subtree 552, and generalized template 512 includes matching sub-tree 562. Sub-tree 553 may be compared to sub-tree 554, wherein it is determined that these paths match, and generalized template 512 includes a matching subtree 564. Note that sub-tree 554 itself contains a STAR node, which may result in the routine that processes STAR subtrees to be recursively invoked. Further note that since sub-tree 554 has at least one instance of u/text, sub-tree 554 matches with sub-tree 553. Sub-tree 555 matches sub-tree 556 because each have td/font/text, and generalized template 512 includes a matching sub-tree within subtree 566.

In response to processing the leftmost subtree in DOM 510, the rightmost subtree may be compared to the template sub-tree 508, again because template 508 contains a STAR node. Sub-tree 561 matches sub-tree 552, corresponding to sub-tree 562 of the generalized template. Sub-tree 563 contains three instances of td/u/text. Because of the STAR operator in sub-tree 554, the sub-trees match. That is, DOM 510 is allowed to have one or more sub-trees td/u/text and be considered a match. For this example embodiment, sub-tree 565 does not match sub-tree 556. In order to generalize template 512 to match initial template 508, template 512 may be modified. For this example, sub-tree 566 may be modified with an optional path td/font/strike/text path via a HOOK operator to complete the generalization of template 512 as it relates to DOM 510.

If a template is modified (or proposed to be modified), the template is said to incur a cost of generalization. This cost represents the cost of modifying the template to match the current document completely, in an embodiment. A low cost implies that the current document is similar to the other documents in the training set used to build the template. On the other hand, a high cost implies relatively large differences and possibly that the current document is heterogeneous with respect to the rest of the training documents. In an embodiment, and as discussed previously, a threshold may be specified for the cost wherein the template is not modified to match the current document if the cost would be too high. Thus, documents that are too dissimilar from the rest of the training documents may be, in effect, removed from the training set.

The following are example factors that may be used to compute the cost. These are merely example factors, and it is not required that all of the factors be used. Further, each factor may be weighed differently, for one or more embodiments. The example factors may include, but are not limited to:

1) The size of the changed subtree (number of nodes in the subtree). The larger the size of the subtree added/modified, the higher the cost of change;
2) The height (depth) of the subtree added/modified. In general, on a modified subtree, nodes added at the top of the subtree may have more importance and hence may incur higher cost than those at the bottom;
3) The level of the template in which the change occurred, computed from the top of the template. The cost may decrease exponentially with increasing level. That is, the changes towards the top of the tree incur more cost than those towards the bottom of the tree; and/or
4) The operator added. In one embodiment, the STAR operator does not add any cost, since it generalizes the repetition count. In one embodiment, the OR operator may induce cost based on whether it is added as a new node to the template or another disjunction is added to an existing OR node. In one embodiment, the HOOK operator cost may depend on whether an existing structure in the template is made optional or whether a new optional subtree is added to the template.

The cost of change for an embodiment may be compared against the sizes of the original template and the current DOM. The size of the current template is computed similar to the one used to compute the cost of change—i.e., every node is weighed proportional to its height in the template. The current page may be said to make a significant change to the template if cost of change induced by the current page is more than a pre-determined fraction (for example, 30%) of the template and DOM sizes. Of course, these are merely examples of calculating template and/or DOM sizes, and the scope of claimed subject mater is not limited in this regard.

Figure 6:
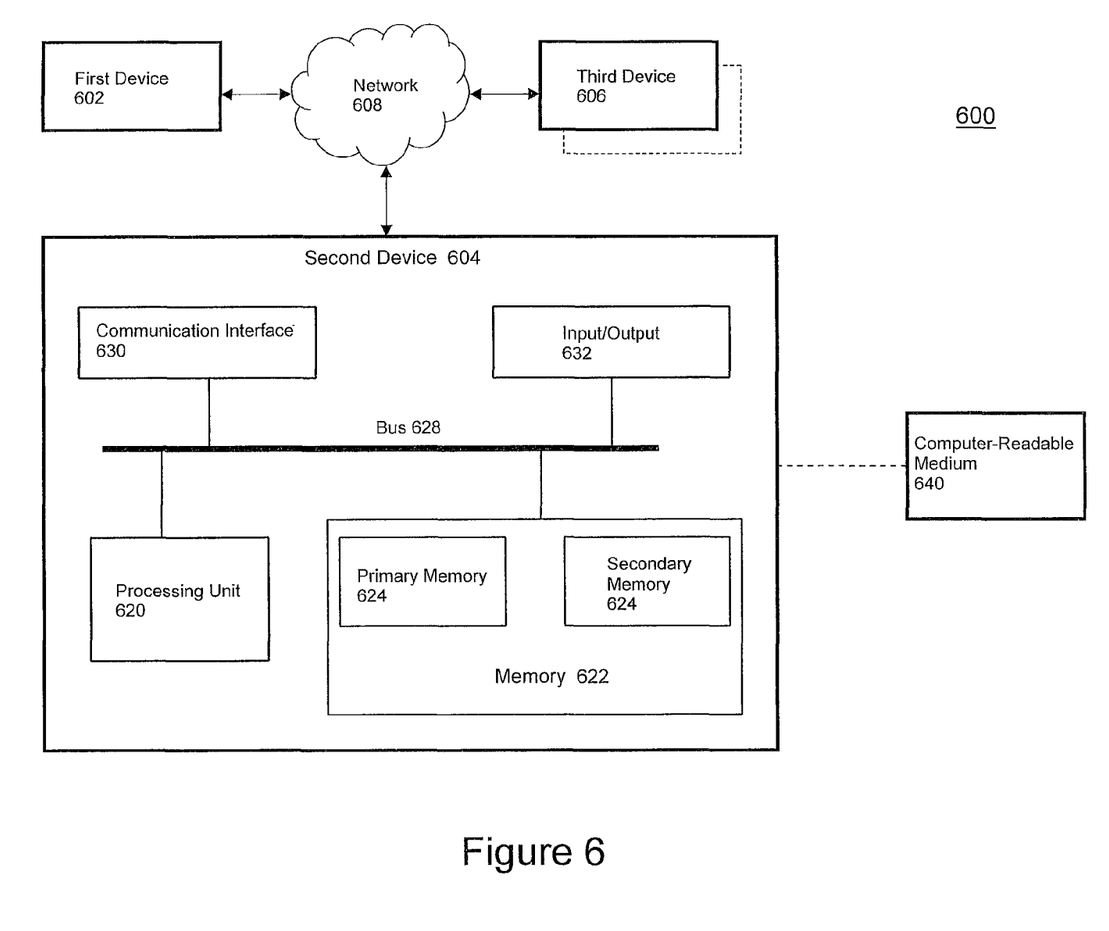
FIG. 6 is a block diagram of an example computing system in accordance with an embodiment.

FIG. 6 is a block diagram of an exemplary embodiment of a computing environment system 600 that may include one or more devices configurable to cluster documents and generate templates using one or more techniques illustrated above, for example. System 600 may include, for example, a first device 602, a second device 604, and a third device 606, which may be operatively coupled together through a network 608.

First device 602, second device 604 and third device 606, as shown in FIG. 6, may be representative of any device, appliance or machine that may be configurable to exchange data over network 608. By way of example but not limitation, any of first device 602, second device 604, or third device 606 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 608, as shown in FIG. 6, is representative of one or more communication links, processes, and/or resources configurable to support the exchange of data between at least two of first device 602, second device 604, and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using or otherwise include hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 640. Computer-readable medium 640 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

Figure 7:
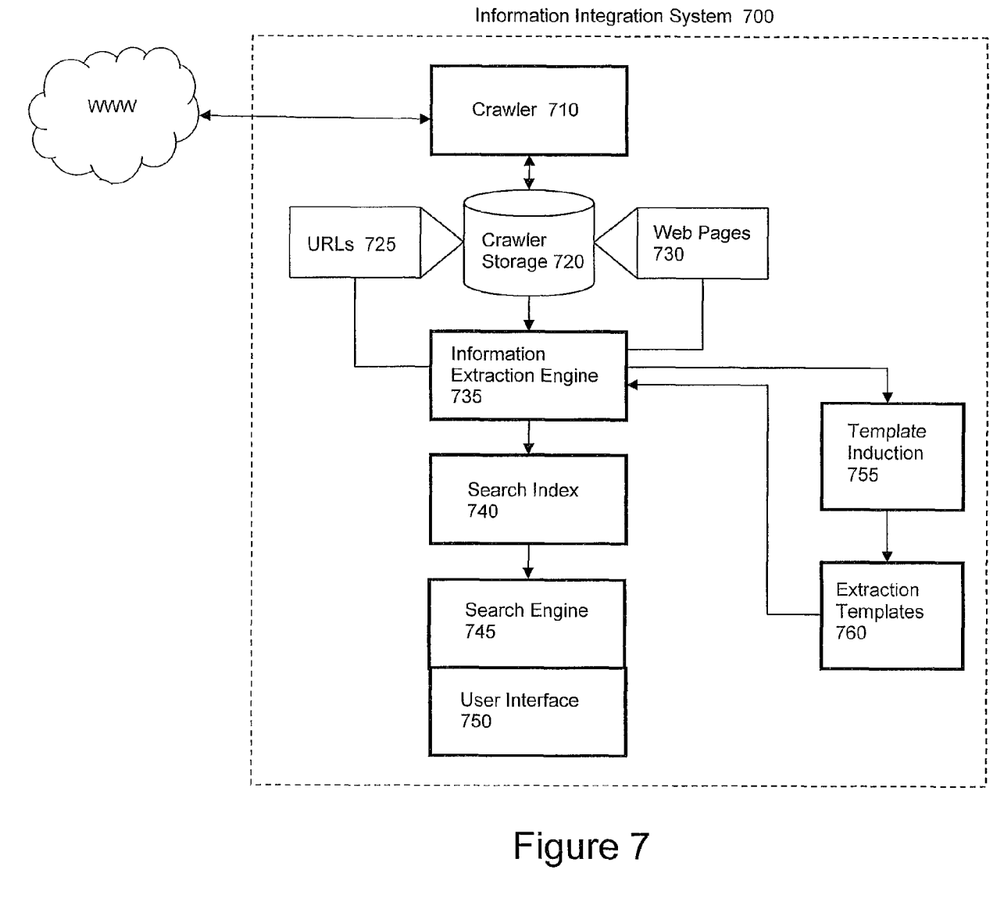
FIG. 7 is a block diagram of an example information integration system in accordance with an embodiment.

FIG. 7 is a block diagram of an example information integration system (IIS) 700 in accordance with an embodiment. The context in which an IIS may be implemented may vary. By way of non-limiting examples, an IIS such as IIS 700 may be implemented for public or private search engines, job portals, shopping search sites, travel search sites, RSS (Really Simple Syndication) based applications and sites, and the like. Embodiments are described herein primarily in the context of a World Wide Web (WWW) search system, for purposes of an example. However, the scope of claimed subject matter is not limited to these examples. Embodiments are possible where the implementation is not limited to Web search systems. For example, embodiments may be implemented in the context of private enterprise networks (e.g., intranets), as well as the public network of networks (i.e., the Internet), although, again, the scope of claimed subject matter is not limited in these respects.

IIS 700 may comprise a crawler 710 communicatively coupled to a source of information, such as the Internet and the World Wide Web (WWW). IIS 700 may further comprise a crawler storage 720, a search engine 745 backed by a search index 740 and associated with a user interface 750.

A web crawler (also referred to as "crawler", "spider", "robot"), such as crawler 710, may operate to "crawl" across the Internet in a methodical and automated manner to locate web pages around the world. Upon locating a page, the crawler may store the page's URL in URLs 725, and may follow any hyperlinks associated with the page to locate other web pages. The crawler may also stores entire web pages 730 (e.g., HTML and/or XML code) and URLs 725 in crawler storage 720. Use of this information, according to embodiments of the invention, are described in greater detail herein.

Search engine 745 generally refers to a mechanism that may be used to index and search a large number of web pages, and may be used in conjunction with user interface 750 that may be used by a user to search the search index 740 by entering certain words or phrases to be queried. In general, the index information stored in search index 740 may be generated based on extracted contents of the HTML file associated with a respective page, for example, as extracted using extraction templates 760 generated by template induction techniques 755. Generation of the index information may comprise a main purpose of system 700, and such information may be generated with the assistance of an information extraction engine 735. For example, if crawler 710 is storing all the pages that have job descriptions, extraction engine 735 may extract useful information from these pages, such as the job title, location of job, experience required, etc. and use this information to index the page in the search index 740. One or more search indexes 740 associated with search engine 745 may comprise a list of information accompanied with the location of the information, i.e., the network address of, and/or a link to, the page that contains the information.

As mentioned, extraction templates 760 may be used to facilitate the extraction of desired information from a group of web pages, such as by information extraction engine 735. Further, extraction templates 755 may be based on the general layout of the group of pages for which a corresponding extraction template is defined. For example, as previously described, an extraction template may be implemented as an HTML file that describes different portions of a group of pages. Template induction processes 755 may be used to generate extraction templates 760.

Information integration system 700 may be implemented in hardware or software, or in a combination of hardware and software. For example, IIS 700 may be implemented in accordance with second device 604, described above.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising: grouping a plurality of electronic documents into a plurality of clusters utilizing a processor of a computing platform to perform a Uniform Resource Locator-based clustering process, wherein said Uniform Resource Locator-based clustering process is based, at least in part, on one or more Uniform Resource Locator attributes for individual electronic documents of the plurality of electronic document; reducing an amount of clusters generated by the Uniform Resource Locator-based clustering process by merging similar clusters based, at least in part, on an expression-based clustering process performed over the plurality of clusters; and providing feedback from the expression-based clustering process to the Uniform Resource Locator-based clustering process to allow refinement of the Uniform Resource Locator-based clustering process to enable additional processing of one or more clusters previously determined by the expression-based clustering process to comprise heterogeneous clusters.

2. The method of claim 1, wherein the plurality of electronic documents comprise web pages.

3. The method of claim 1, further comprising generating a plurality of bins based, at least in part, on the expression-based clustering process performed over the plurality of clusters, wherein individual bins of the plurality of bins comprises a template and one or more clusters, and wherein the number of bins is less than the number of clusters.

4. The method of claim 3, wherein said expression-based clustering process comprises:
generating an initial template based, at least in part, on a structure of at least a portion of a first electronic document from a first subset of a first cluster, wherein the first subset includes a plurality of electronic documents sampled from the first cluster; and
generalizing the initial template to form a first generalized template based, at least in part, on comparisons between the structure of the initial template and the structures of at least portions of one or more other electronic documents from the subset of the first cluster.

5. The method of claim 4, wherein said generalizing the initial template further comprises determining for individual electronic documents of the plurality of electronic documents of the first subset whether a cost for generalizing the initial template exceeds a specified maximum cost threshold.

6. The method of claim 5, further comprising ceasing said generalizing the initial template at least in part in response to a determination that an amount of electronic documents of the first subset exceeding the specified maximum cost threshold exceeds a specified maximum documents dropped threshold.

7. The method of claim 5, further comprising storing the first cluster and the first generalized template in a first bin in a memory of the computing platform at least in part in response to a determination that the amount of electronic documents of the first subset exceeding the specified maximum cost threshold does not exceed the specified maximum documents dropped threshold.

8. The method of claim 7, further comprising extracting information from one or more electronic documents from the first cluster using the first generalized template.

9. The method of claim 8, further comprising comparing structures of at least a portion of individual electronic documents of a second subset of electronic documents from a second cluster with a plurality of templates associated respectively with a plurality of bins.

10. The method of claim 9, further comprising calculating for individual templates of the plurality of templates associated with the plurality of bins a number of electronic documents from the second subset whose cost for generalizing the template exceeds the specified maximum cost threshold.

11. The method of claim 10, further comprising ceasing processing of the second cluster with a second template of the plurality of templates at least in part in response to a determination that an amount of electronic documents from the second subset exceeding the specified maximum cost threshold exceeds the maximum documents dropped threshold.

12. The method of claim 10, further comprising generating a new template corresponding to a new bin at least in part in response to a determination that the amount of electronic documents from the second subset exceeding the specified maximum cost threshold exceeds the maximum documents dropped threshold for all of the templates associated with the plurality of bins, and further comprising storing the second cluster and the new template in the new bin in the memory of the computing platform.

13. The method of claim 10, further comprising determining which of the plurality of templates has the smallest average cost for generalizing the template using the second template, and storing the second cluster in the bin associated with the template with the smallest average cost for generalizing the template.

14. An article, comprising: a non-transitory computer-readable medium having stored thereon instructions executable by a processor of a computing platform to:
group a plurality of electronic documents into a plurality of clusters using a Uniform Resource Locator-based clustering process, wherein said Uniform Resource Locator-based clustering process is based, at least in part, on one or more Uniform Resource Locator attributes for individual electronic documents of the plurality of documents;

reduce an amount of clusters at least in part by merging similar clusters based, at least in part, on an expression-based clustering process performed over the plurality of clusters; and provide feedback from the expression-based clustering process to the Uniform Resource Locator-based clustering process to allow refinement the Uniform Resource Locator-based clustering process to enable additional processing of one or more clusters previously determined by the expression-based clustering process to comprise heterogeneous clusters.

15. The article of claim 14, wherein the plurality of electronic documents comprise web pages.

16. The article of claim 14, wherein the computer-readable medium has stored thereon further instructions executable by the processor to generate a plurality of bins based, at least in part, on the expression-based clustering process performed over the plurality of clusters, wherein individual bins of the plurality of bins comprises a template and one or more clusters, and wherein the number of bins is less than the number of clusters.

17. The article of claim 14, wherein the computer-readable medium has stored thereon further instructions executable by the processor to:
generate an initial template based, at least in part, on a structure of at least a portion of a first electronic document from a first subset of a first cluster, wherein the first subset includes a plurality of electronic documents sampled from the first cluster; and
generalizing the initial template to form a first generalized template based, at least in part, on comparisons between the structure of the initial template and the structures of at least portions of one or more other electronic documents from the subset of the first cluster.

18. The article of claim 17, wherein the computer-readable medium has stored thereon further instructions executable by the processor to generalize the initial template at least in part by determining for individual electronic documents of the plurality of electronic documents of the first subset whether a cost for generalizing the initial template exceeds a specified maximum cost threshold.

19. The article of claim 18, wherein the computer-readable medium has stored thereon further instructions executable by the processor to cease to generalize the initial template at least in part in response to a determination that an amount of electronic documents of the first subset exceeding the specified maximum cost threshold exceeds a specified maximum documents dropped threshold.

20. The article of claim 18, wherein the computer-readable medium has stored thereon further instructions executable by the processor to store the first cluster and the first generalized template in a first bin in a memory in the computing platform at least in part in response to a determination that the amount of electronic documents of the first subset exceeding the specified maximum cost threshold does not exceed the specified maximum documents dropped threshold.

21. The article of claim 20, wherein the computer-readable medium has stored thereon further instructions executable by the processor to extract information from one or more electronic documents from the first cluster using the first generalized template.

22. The article of claim 20, wherein the computer-readable medium has stored thereon further instructions executable by the processor to:
compare structures of at least a portion of individual electronic documents of a second subset of electronic documents from a second cluster with a plurality of templates associated respectively with a plurality of bins;
calculate for individual templates of the plurality of templates associated with the plurality of bins a number of electronic documents from the second subset whose cost for generalizing the template exceeds the specified maximum cost threshold; and
cease processing of the second cluster with a second template of the plurality of templates at least in part in response to a determination that the amount of electronic documents from the second subset exceeding the specified maximum cost threshold exceeds the maximum documents dropped threshold.

23. The article of claim 22, wherein the computer-readable medium has stored thereon further instructions executable by the processor to generate a new template corresponding to a new bin at least in part in response to a determination that the amount of electronic documents from the second subset exceeding the specified maximum cost threshold exceeds the maximum documents dropped threshold for all of the templates associated with the plurality of bins, and wherein the computer-readable medium has stored thereon further instructions executable by the processor to store the second cluster and the new template in the new bin in the memory of the computing platform.

24. The article of claim 22, wherein the computer-readable medium has stored thereon further instructions executable by the processor to:
determine which of the plurality of templates has the smallest average cost for generalizing the template using the second template; and
store the second cluster in the bin associated with the template with the smallest average cost for generalizing the template.

25. An apparatus, comprising:
means for grouping a plurality of electronic documents into a plurality of clusters using a Uniform Resource Locator-based clustering process utilizing at least in part of a processor, wherein said Uniform Resource Locator-based clustering process is based, at least in part, on one or more Uniform Resource Locator attributes for individual electronic documents of the plurality of electronic documents; and
means for reducing an amount of clusters generated by the Uniform Resource Locator-based clustering process by merging similar clusters based, at least in part, on an expression-based clustering process performed over the plurality of clusters; and
means for providing feedback from the expression-based clustering process to the Uniform Resource Locator-based clustering process to allow refinement of the Uniform Resource Locator-based clustering process to enable additional processing of one or more clusters previously determined by the expression-based clustering process to comprise heterogeneous clusters.

26. The apparatus of claim 25, further comprising means for generating a plurality of bins based, at least in part, on the expression-based clustering process performed over the plurality of clusters, wherein individual bins of the plurality of bins comprise a template and one or more clusters, and wherein the number of bins is less than the number of clusters.

27. The apparatus of claim 25, wherein said means for identifying heterogeneous clusters using the expression-based clustering process comprises:
means for generating an initial template based, at least in part, on a structure of at least a portion of a first electronic document from a first subset of a first cluster, wherein the first subset includes a plurality of electronic documents sampled from the first cluster; and means for generalizing the initial template to form a first generalized template based, at least in part, on comparisons between the structure of the initial template and the structures of at least portions of one or more other electronic documents from the subset of the first cluster.

* * * * *